United States Patent
Shibayama et al.

(10) Patent No.: US 12,496,938 B2
(45) Date of Patent: Dec. 16, 2025

(54) VEHICLE SEAT

(71) Applicant: TS TECH CO., LTD., Asaka (JP)

(72) Inventors: Hiroki Shibayama, Shioya-gun Tochigi (JP); Koji Onuma, Shioya-gun Tochigi (JP)

(73) Assignee: TS TECH CO., LTD., Saitama (JP)

( * ) Notice: Subject to any disclaimer, the term of this patent is extended or adjusted under 35 U.S.C. 154(b) by 217 days.

(21) Appl. No.: 18/544,087

(22) Filed: Dec. 18, 2023

(65) Prior Publication Data

US 2024/0116404 A1 Apr. 11, 2024

Related U.S. Application Data

(63) Continuation of application No. PCT/JP2022/025208, filed on Jun. 23, 2022.

(30) Foreign Application Priority Data

Jun. 25, 2021 (JP) .................................. 2021-105700

(51) Int. Cl.
*B60N 2/12* (2006.01)
*B60N 2/07* (2006.01)
(Continued)

(52) U.S. Cl.
CPC .............. *B60N 2/0722* (2013.01); *B60N 2/12* (2013.01); *B60N 2/20* (2013.01); *B60N 2/919* (2018.02)

(58) Field of Classification Search
CPC .......... B60N 2/0722; B60N 2/12; B60N 2/20; B60N 2/919
See application file for complete search history.

(56) References Cited

U.S. PATENT DOCUMENTS

| 5,927,809 A | * | 7/1999 | Tame | ...................... B60N 2/123 |
| | | | | 297/378.12 |
| 6,986,551 B2 | | 1/2006 | Ohba | |

(Continued)

FOREIGN PATENT DOCUMENTS

| JP | 2003291702 A | 10/2003 |
| JP | 2004058928 A | 2/2004 |

(Continued)

OTHER PUBLICATIONS

Notice of Reasons for Refusal issued for Japanese Patent Application No. 2023-530133, Dispatch date: Dec. 17, 2025, 10 pages including English machine translation.

(Continued)

*Primary Examiner* — Philip F Gabler
(74) *Attorney, Agent, or Firm* — HSML P.C.

(57) ABSTRACT

A vehicle seat includes a base part, a first movable part, a second movable part, a lock member, and an interlocking mechanism configured to link movement of the lock member to movement of the second movable part. The interlocking mechanism includes an attaching member, a first rotational member connected to the second movable part, a second rotational member connected to the lock member, and a swingable member provided swingably on the second rotational member. The engagement of the swingable member and the first rotational member causes the first rotational member and the second rotational member to rotate together, whereby the lock member moves from a lock position to an unlock position. The swingable member disengaging from the first rotational member permits the first rotational member and the second rotational member to rotate independently, whereby the lock member moves from the unlock position to the lock position.

10 Claims, 7 Drawing Sheets

(51) Int. Cl.
  *B60N 2/20*    (2006.01)
  *B60N 2/90*    (2018.01)

(56) References Cited

U.S. PATENT DOCUMENTS

| | | | |
|---|---|---|---|
| 7,690,728 B2 * | 4/2010 | Miyauchi | B60N 2/0881 |
| | | | 297/367 R |
| 8,038,217 B2 * | 10/2011 | Yamagishi | B60N 2/309 |
| | | | 297/378.12 |
| 8,960,757 B2 | 2/2015 | Otake et al. | |
| 9,114,732 B2 * | 8/2015 | Cooley | B60N 2/305 |
| 9,254,761 B1 * | 2/2016 | Aktas | B60N 2/12 |
| 10,252,644 B2 * | 4/2019 | Aktas | B60N 2/20 |
| 11,376,993 B2 * | 7/2022 | Banales Cano | B60N 2/02246 |
| 2004/0021355 A1 | 2/2004 | Ohba | |
| 2013/0300145 A1 | 11/2013 | Otake et al. | |

FOREIGN PATENT DOCUMENTS

| | | | |
|---|---|---|---|
| JP | 2009255811 A | 11/2009 |
| JP | 2012140076 A | 7/2012 |
| JP | 2021066437 A | 4/2021 |

OTHER PUBLICATIONS

International Search Report issued for International Patent Application No. PCT/JP2022/025208, Date of mailing: Sep. 13, 2022, 5 pages including English translation.
Written Opinion issued for International Patent Application No. PCT/JP2022/025208, Date of mailing: Sep. 13, 2022, 8 pages including English translation.

* cited by examiner

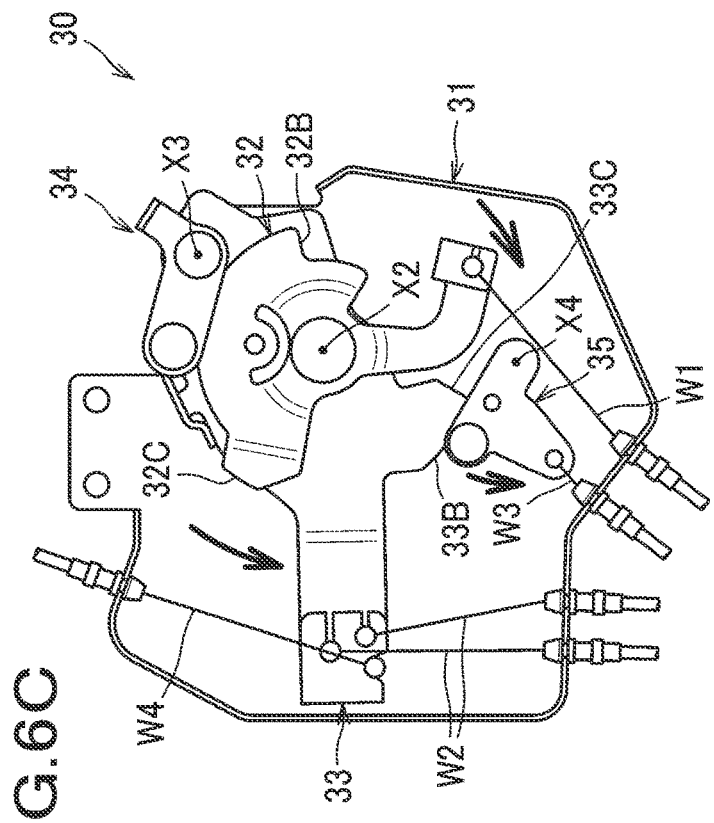
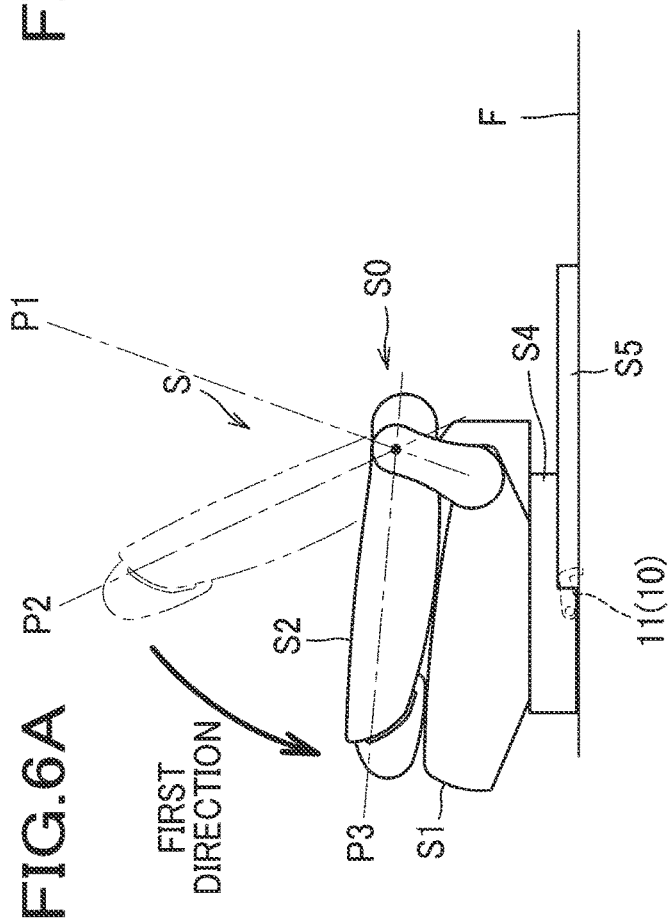
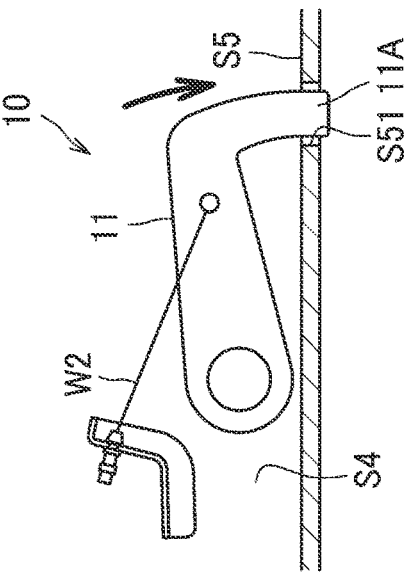

VEHICLE SEAT

REFERENCE TO RELATED APPLICATIONS

This application is a continuation application of International Application No. PCT/JP2022/025208 filed on Jun. 23, 2022 which claims priority from Japanese Patent Application No. 2021-105700 filed on Jun. 25, 2021. The disclosures of these applications are incorporated herein by reference in their entirety.

TECHNICAL FIELD

The present disclosure relates to a vehicle seat.

BACKGROUND ART

A vehicle seat comprising a slide lock member that locks a sliding movement of the vehicle seat in a front-rear direction and an interlocking mechanism that links the movement of the slide lock member to the tilting of a seat back is known in the art (refer to JP 2012-140076 A). The interlocking mechanism comprises a rail unlocking lever rotatably provided on the seat back, a bar-shaped member connecting the rail unlocking lever and the slide lock member, and a cancel lever engagable with the rail unlocking lever.

This vehicle seat further comprises a reclining device that allows the seat back to be tilted and moved between a sitting position in which the seat back is raised and a storable position in which the seat back is folded on top of the seat cushion. Besides the reclining device, this vehicle seat also comprises a retaining mechanism that retains the seat back in a middle positon which is a position between the sitting position and the storable position. In this configuration, when the lock of the reclining device is released and the seat back is moved from the sitting position to the middle position by a spring of the reclining device, the cancel lever rotates in synchronization with the rotation of the seat back and pushes the rail unlocking lever, whereby the slide lock member is unlocked. Also, when the seat back positioned in the middle position is manually moved from the middle position to the storable position, the cancel lever rotating in synchronization with the rotation of the seat back disengages from the rail unlocking lever, and therefore the slide lock member is locked again.

DESCRIPTION

Inventors of the present application have invented an interlocking mechanism with a new structure for linking the movement of the slide lock member to the tilting of the seat back. The inventors of the present application also consider that this interlocking mechanism may be given an expanded range of uses, not limited to the linking of the movement of the slide lock member and the tilting of the seat back, and can be used for linking of a movement of a lock member for locking a first movable part to a movement of a second movable part that moves relative to the first movable part.

It is desired to provide a new mechanism for linking a movement of a lock member for locking a first movable part to a second movable part that moves relative to the first movable part.

It is also desired to make a vehicle seat smaller in size.

Retaining a lock member in an unlock position is also desired.

Therefore, an improvement in a vehicle seat having a seat cushion and a seat back is proposed. In one embodiment, the vehicle seat comprises a base part, a first movable part, a second movable part, a lock member, and an interlocking mechanism. The first movable part is movable relative to the base part. The second movable part is movable relative to the first movable part from a first position to a second position in first direction, from the second positon to a third position in the first direction, from the third position to the second positon in a second direction opposite to the first direction, and from the second position to the first position in the second direction. The lock member is configured to move between a lock position in which the movement of the first movable part is locked and an unlock position in which lock of the first movable part is released. The interlocking mechanism is configured to link movement of the second movable part to movement of the lock member.

The interlocking mechanism comprises an attaching member, a first rotational member and a second rotational member, a first connecting member, a second connecting member, and a second connecting member. The attaching member is attached to the vehicle seat. The first rotational member and the second rotational member are rotatably provided on the attaching member. The first connecting member connects the second movable part and the first rotational member. The second connecting member connects the lock member and the second rotational member. The swinging member is swingably provided on the second rotational member, such that the swinging member engages with the first rotational member when the second movable part is positioned in a range between the first position and the second position, and disengages from the first rotational member in the process in which the second movable part moves from the second position to the third position.

When the second movable part moves from the first position to the second position, engagement of the first rotational member and the swinging member causes the first rotational member and the second rotational member to rotate together, whereby the lock member moves from the lock position to the unlock position.

When the second movable part moves from the second position to the third position, the swinging member disengages from the first rotational member, permitting the first rotational member and the second rotational member to rotate independently, whereby the lock member moves from the unlock position to the lock position.

With this configuration, the lock state of the lock member can be switched upon engagement or disengagement of the swinging member, swingably provided on the second rotating member with or from the first rotational member. Therefore, a new mechanism can be provided for linking the movement of the lock member for locking the first movable part to the movement of the second movable part movable relative to the first movable part.

The first rotational member and the second rotational member may also be configured to rotate about a common rotation axis.

With this configuration, the interlocking mechanism can be made smaller in size compared to, for example, a configuration in which the rotation axis of the first rotational member and the rotation axis of the second rotational member are located at different positions, and so that the vehicle seat can be made smaller in size.

The interlocking mechanism may also comprise a retaining member that retains the lock member in the unlock position by restraining the second rotational member from rotating when the second movable part is in the second position.

With this configuration, the lock member can be retained in the unlock position by the retaining member restraining the rotation of the second rotational member.

Also the retaining member may be configured to be capable of being rotated between a restraining position in which the second rotational member is restrained from rotating and an allowing position in which the second rotational member is allowed to rotate. When the second movable part is positioned in the first positon, the retaining member is positioned in the allowing position. When the second movable part moves from the first position to the second position, the retaining member rotates from the allowing position to the restraining position.

The interlocking mechanism may also comprise a restraining spring that biases the retaining member in such a direction as to cause the retaining member to rotate from the allowing position toward the restraining position.

Also, the interlocking mechanism may further comprise a third connecting member that connects the second movable part and the retaining member. The retaining member may be configured to rotate from the restraining position to the allowing position when the second movable part moves from the second position to the third position.

Also, the first connecting member may be configured to link movement of the second movable part to movement of the first rotational member both when the second movable part moves from the first position to the second position and when the second movable part moves from the second position to the third position. The third connecting member may be configured to not link movement of the second movable part to movement of the retaining member when the second movable part moves from the first position to the second position, and link movement of the second movable part to movement of the retaining member when the second movable part moves from the second position to the third position.

The interlocking mechanism may also comprise a first spring that biases the first rotational member in a direction opposite to a direction of a force that the first rotational member receives from the first connecting member, and a second spring that biases the second rotational member in a direction of rotation the first rotational is caused to make by the biasing force of the first spring.

The vehicle seat may also comprise a drive spring that biases the second movable part to cause the second movable part to move from the first position toward the third position. A torque applied by the drive spring to the first rotational member is higher than a total torque applied by the first spring and the second spring to the first rotational member.

The lock member may also be a slide lock member for locking and unlocking the sliding movement of the seat cushion.

The above aspects, other advantages and further features will become more apparent by describing in detail illustrative, non-limiting embodiments thereof with reference to the accompanying drawings, in which:

FIG. 6A is a diagram showing a state of the vehicle seat when the seat back is moved from the second position to a third position.

FIG. 6B is a diagram showing a state of the slide lock mechanism when the seat back is moved from the second positon to the third position.

FIG. 6C is a diagram showing a state of the interlocking mechanism when the seat back is moved from the second position to the third position.

Hereinafter, an embodiment of the vehicle seat will be described with reference to the drawings.

Figure 1:
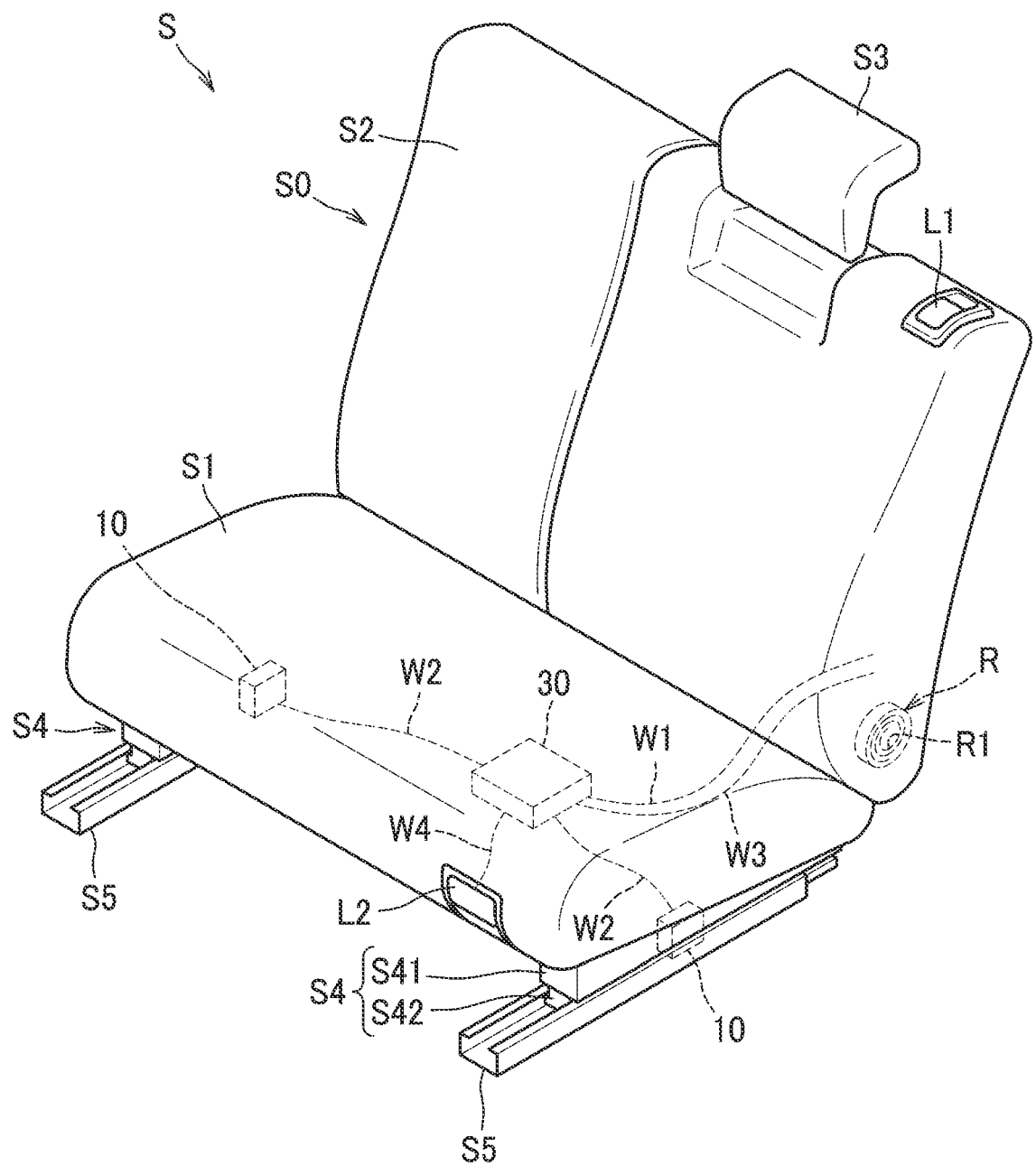
FIG. 1 is a perspective view of a vehicle seat according to one embodiment.

A vehicle seat S illustrated in FIG. 1 is, for example, a seat in the second row of a vehicle. The vehicle seat S comprises a seat body S0, a reclining device R, left and right lower structures S4 as an example of a first movable part, and left and right lower rails S5 as an example of a base part. In the following description, the designations of front/rear (frontward/rearward), left/right (leftward/rightward), and up/down (upward/downward; upper/lower) are based on directions as viewed from an occupant seated on the seat.

The seat body S0 comprises a seat cushion S1, a seat back S2 as an example of a second movable part, and a headrest S3. The seat back S2 is rotatably supported by the seat cushion S1. In other words, the seat back S2 is rotatable in a first direction and a second direction opposite to the first direction relative to the lower structures S4. Specifically, the seat back S2 is configured to be rotatable from a first position P1 (the initial position in FIG. 3A), in a first direction to a second positon P2 (the position in FIG. 4A) away from the first position P1, and further in the first direction to a third position P3 (the position in FIG. 6A) further away from the first position P1. The seat back S2 is configured to be rotatable from the third position P3 in the second direction to the second position P2, and further in the second direction to the first position P1. The seat back S2 in the second position P2 is rotatable in the first direction to the third position P3 and in the second direction to the first position P1. When the seat back S2 is in the first position P1, the seat back S2 is raised from the seat cushion S1, so that an occupant can be seated on the seat body S0. When the seat back S2 is in the third position P3, the seat back S2 is folded on top of the seat cushion S1. The second position P2 is a position between the first position P1 and the third position P3.

The seat body S0 comprises a seat back retaining member not shown in the figures. The seat back retaining member is a member that retains the seat back S2 in the second position P2. In the present embodiment, the seat back retaining member is a retaining spring that biases the seat back S2 in such a direction as to cause the seat back S2 to rotate from the third position P3 toward the second position P2 and retains the seat back S2 in the second position P2. However, alternatively, the seat back retaining member may be, for example, a lock member capable of locking the seat back S2 in the second position P2 and releasing the lock of the seat back S2 in the second position P2.

The reclining device R is a device for switching the seat back S2 between a state rotatable relative to the seat cushion S1 and a state not rotatable relative to the seat cushion S2. The reclining device R includes a reclining spring R1 as an example of a drive spring. The reclining spring R1 biases the seat back S2 in such a direction as to cause the seat back S2 to move from the first position P1 toward the third position P3. Specifically, the reclining spring R1 biases the seat back S2 to cause the seat back S2 to move from the first position P1 to the second position P2. When the seat back S2 is positioned in the second position P2, the biasing force of the reclining spring R1 does not affect the seat back S2. Therefore, the seat back S2 is retained in the second position P2 by the retaining spring.

The seat body S0 comprises a seat back lock member not shown in the figures. The seat back lock member is a member capable of locking the seat back S2 in the third position P3 and releasing the lock of the seat back S2 in the third position P3. When the occupant rotates the seat back S2 against the biasing force of the retaining spring from the second position P2 to the third position P3, the seat back S2 is locked in the third position P3 by the seat back lock member.

The reclining device R comprises a reclining lock member not shown in the figures capable of locking the seat back S2 in the first position P1. A reclining unlocking lever L1 for releasing the lock of the seat back S2 from the lock by the reclining lock member is provided at an upper part of the seat back S2. The reclining unlocking lever may alternatively be provided at a side surface of the seat cushion S1, or may be provided at both of the upper part of the seat back S2 and the side surface of the seat cushion S1.

The lower structures S4 are provided at a left side and a right side of a lower surface of the seat cushion S1, and protrude from the lower surface of the seat cushion S1. Each of the lower structures S4 comprises a base frame S41 connected to the seat cushion S1 and an upper rail S42 fixed to the lower end of the base frame S41. The upper rail S42 is configured to be slidable in a front-rear direction relative to a lower rail S5. The seat cushion S1 is attached to the upper rail S42 via the base frame S41.

The lower rail S5 supports the upper rail S42 in such a manner that permits the upper rail S42 to move in the front-rear direction. The lower rail S5 is fixed to a floor F (refer to FIG. 3A) of the vehicle.

A slide lock mechanism 10 is provided on each of the lower structures S4. The slide lock mechanism 10 is a mechanism that allows and restrains a sliding movement of the seat body S0 in the front-rear direction. The slide lock mechanism 10 is provided at each of the left and right lower structures S4.

Figure 3A:
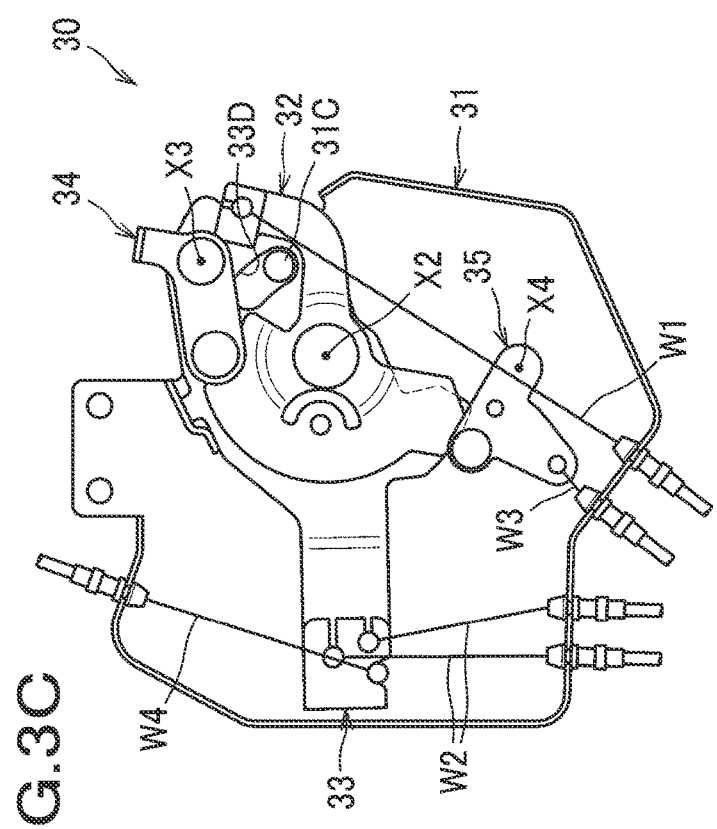
FIG. 3A is a diagram showing the vehicle seat in an initial state.
Figure 3C:
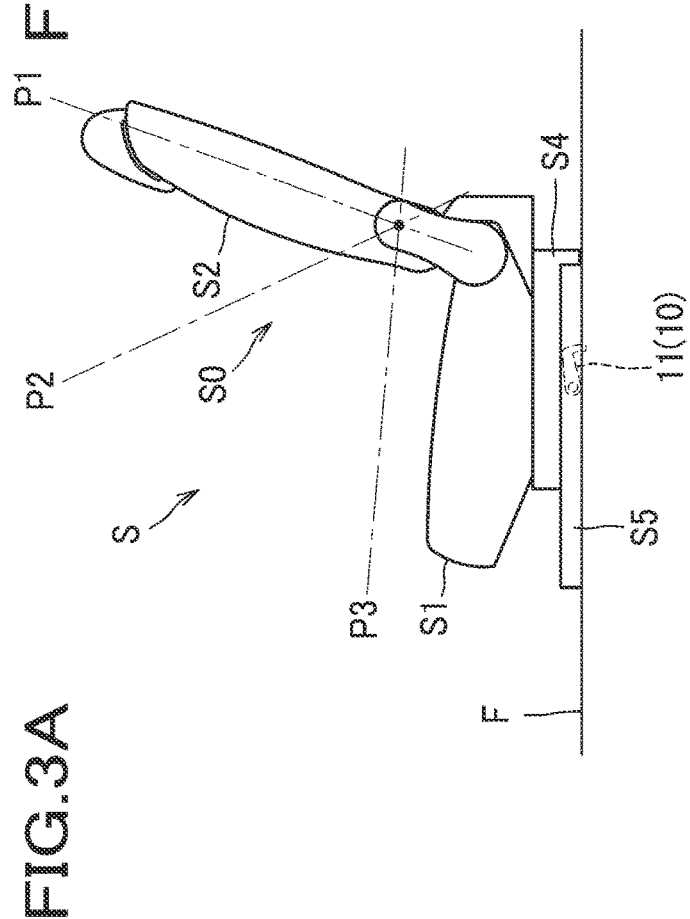
FIG. 3C is a diagram showing a state of an interlocking mechanism when the vehicle seat is in the initial state.
Figure 3B:
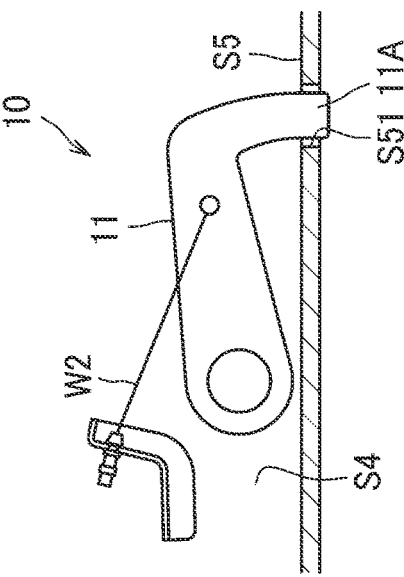
FIG. 3B is a diagram showing a state of a slide lock mechanism when the vehicle seat is in the initial state.

As shown in FIG. 3B, the slide lock mechanism 10 comprises a slide lock member 11 as an example of a lock member. The slide lock member 11 is a member for locking and unlocking the sliding movement of the seat body S0. The slide lock member 11 is rotatably supported by the lower structure S4. A hook-shaped end portion 11A of the rotatable slide lock member 11 is engagable with a hole S51 formed in the lower rail S5. The slide lock member 11 is capable of moving between a lock position in which the sliding movement of the seat body S0 is locked (the position in FIG. 3B), and an unlock position in which the lock of the seat body S0 is released (the position in FIG. 4B). The slide lock member 11 is biased in such a direction as to cause the slide lock member 11 to move from the unlock position toward the lock position by a spring not shown in the figures.

As shown in FIG. 1, the interlocking mechanism 30 for linking movement of the slide lock mechanism 10 to the movement of the seat back S2 is provided below the seat cushion S1. The interlocking mechanism 30 is configured such that, when the seat back S2 rotates from the first position P1 to the second position P2, the state of the slide lock mechanism 10 changes from a lock state to an unlock state, and when the seat back S2 rotates from the second position P2 to the third position P3, the state of the slide lock mechanism 10 changes from the unlock state to the lock state.

The interlocking mechanism 30 includes a first wire W1 as an example of a first connecting member, a second wire W2 as an example of a second connecting member, a third wire W3 as an example of a third connecting member, and a fourth wire W4. The members inside the interlocking mechanism 30 are connected to the seat back S2 by the first wire W1 and the third wire W3. This enables a force produced by the rotation of the seat back S2 to be transmitted to the interlocking mechanism 30.

The left and right slide lock mechanisms 10 are each connected to members inside the interlocking mechanism 30 by the second wire W2. This enables the force transmitted from the seat back S2 to the interlocking mechanism 30 to be transmitted to the left and right slide lock mechanisms 10.

A slide lock unlocking lever L2 for releasing the lock of the slide lock mechanism 10 is provided on the front end portion of the seat cushion S1. The slide lock unlocking lever L2 is connected to the member inside the interlocking mechanism 30 by the fourth wire W4. This enables the force applied to the slide lock unlocking lever L2 to be transmitted to the left and right slide lock mechanisms 10.

Figure 2:
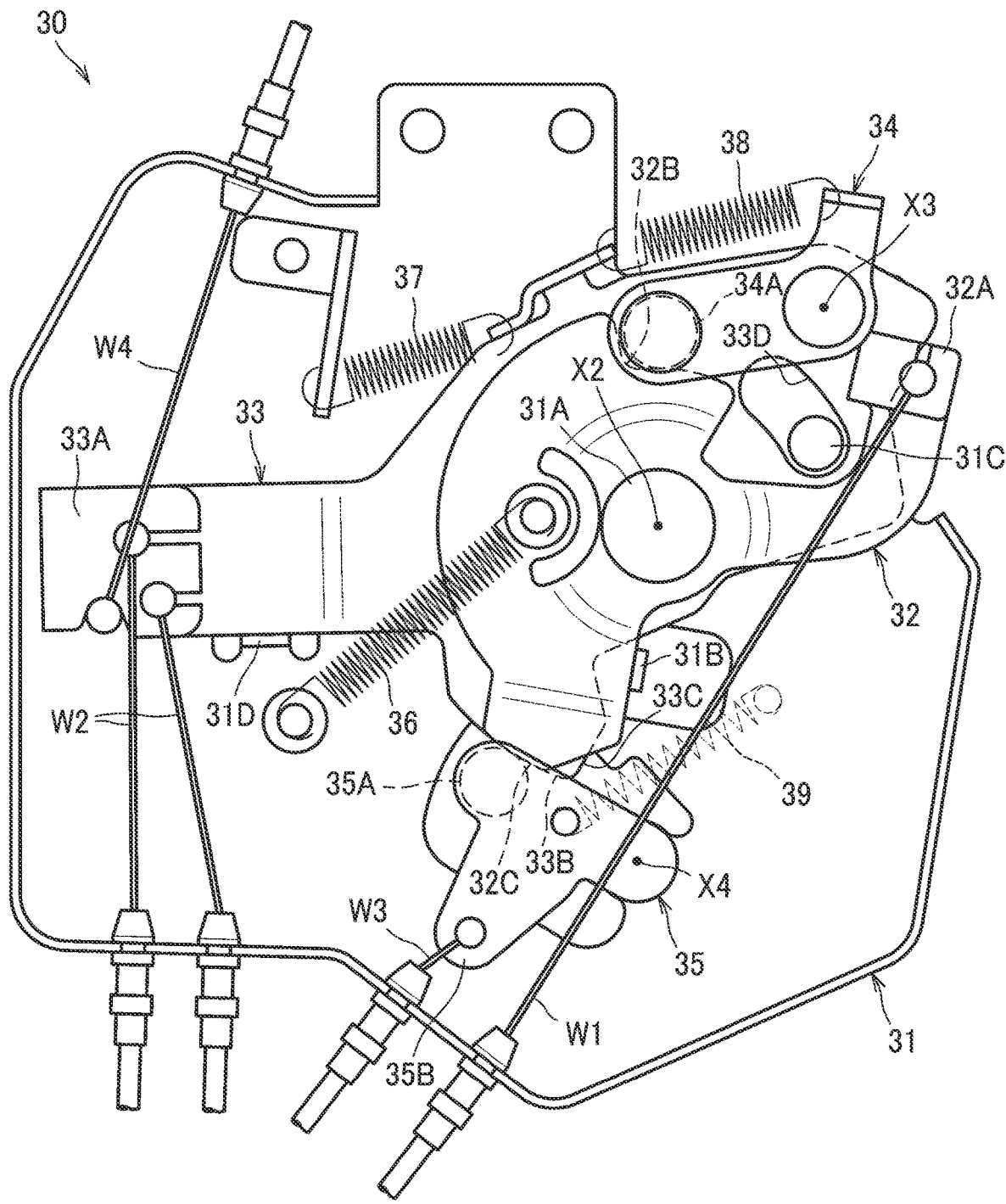
FIG. 2 is a diagram showing an interlocking mechanism.

As shown in FIG. 2, the interlocking mechanism 30 comprises an attaching member 31, a first rotational member 32, a second rotational member 33, a swingable member 34, a retaining member 35, a first spring 36, a second spring 37, a swinging spring 38, and a restraining spring 39. Each of the members (31 to 39) constituting the interlocking mechanism 30 are, for example, made of metal.

The attaching member 31 is a member to be attached to the lower structure S4. The attaching member 31 is formed in a box-shape by bending outer edges of a metal sheet.

The first rotational member 32 and the second rotational member 33 are provided on the attaching member 31, rotatably about a common rotation axis X2. Specifically, the first rotational member 32 and the second rotational member 33 are rotatably supported by a boss 31A provided on the attaching member 31. The boss 31A has a shape of a solid cylinder.

The first rotational member 32 includes a wire connecting part 32A to which one end of the first wire W1 is connected. The other end of the first wire W1 is connected to the seat back S2. The first rotational member 32 is thus rotatable in conjunction with the rotation of the seat back S2 to a first rotational position (a position in FIG. 3C) corresponding to the first position P1 of the seat back S2, to a second rotational position (a position in FIG. 4C) corresponding to the second position P2 of the seat back S2, and to a third rotational position (a position in FIG. 6C) corresponding to the third position P3 of the seat back S2. In the description below, a rotational direction in which the first rotational member 32 pulled by the first wire W1 rotates, i.e. the clockwise direction, will also be referred to as a first rotational direction, and a direction opposite to the first rotational direction will also be referred to as a second rotational direction.

The first rotational member 32 further includes an engaging edge portion 32B that engages with the swingable member 34, and a restraining edge portion 32C that restrains the retaining member 35 from rotating. The engaging edge portion 32B and the restraining edge portion 32C are each formed as a part of the outer edge of the first rotational member 32.

The engaging edge portion 32B is positioned upstream in the first rotational direction relative to a swingable engagement portion 34A (which will be described below) of the swingable member 34. The engaging edge portion 32B engages the swingable engagement portion 34B when the first rotational member 32 is positioned between the first rotational position and the second rotational position, and the engaging edge portion 32B is disengaged from the swingable engagement portion 34A in the process in which the first rotational member 32 moves from the second rotational position to the third rotational position. Therefore, the swingable member 34 engages with the engaging edge portion 32B of the first rotational member 32 when the seat back S2 is positioned between the first position P1 and the second position P2, and the swingable member 34 disengages from the engaging edge portion 32B of the first rotational member 32 in the process in which the seat back S2 moves from the second position P2 to the third position P3.

The restraining edge portion 32C is formed in a shape of a segment of a circle of which a center coincides with the rotation axis X2. The restraining edge portion 32C is in contact with a pin 35A of the retaining member 35, which will be described below, in the process in which the first rotational member 32 moves from the first rotational position to the second rotational position, and is disengaged from the pin 35A when the first rotational member 32 reaches the second rotational position.

The first rotational member 32 is biased in the second rotational direction by the first spring 36. In other words, the first spring 36 biases the first rotational member 32 in a direction opposite to a direction of a force the first rotational member 32 receives from the first wire W1. The attaching member 31 includes a restraining wall 31B that restrains the first rotational member 32 from moving from the first rotational position in the second direction.

The second rotational member 33 includes a wire connecting part 33A to which one end of each of the two second connecting wires W2 and one end of the fourth wire W4 are connected. The other ends of the second wires W2 are connected to the respective right and left slide lock members 11 described above (refer to FIG. 3B). The other end of the fourth wire W4 is connected to the slide lock unlocking lever L2 described above (refer to FIG. 1).

The second rotational member 33 further includes a restraining edge portion 33B that restrains the retaining member 35 from rotating, and a contact edge portion 33C that is contactable with the retaining member 35 in a rotational direction of the second rotational member 33. The restraining edge portion 33B and the contact edge portion 33C are each formed as a part of the outer edge of the rotating member 33.

The restraining edge portion 33B is formed in a shape of a segment of a circle of which a center coincides with the rotation axis X2. The restraining edge portion 33B overlaps the restraining edge portion 32C of the first rotational member 32 when projected in a direction parallel to the rotation axis X2. The restraining edge portion 33B is similar to the restraining edge portion 32C of the first rotational member 32, capable of contacting and disengaging from the pin 35A of the retaining member 35.

The contact edge portion 33C extends from the downstream end of the restraining edge portion 33B in the second rotational direction, toward the rotation axis X2. The contact edge portion 33C contacts the pin 35A when the retaining member 35 is positioned in the restraining position (the position in FIG. 4C) which will be described later.

The second rotational member 33 further includes an hole 33D having a shape of a segment of a circle of which a center coincides with the rotation axis X2. The attaching member 31 includes a restraining protrusion 31C that can be inserted in the hole 33D. When the second rotational member 33 is positioned as shown in FIG. 4C (the position corresponding to the second rotational position), the restraining protrusion 31C contacts the upstream end of the hole 33D upstream in the first rotational direction, and restrains the second rotational member 33 from moving in the first rotational direction from the position shown in FIG. 4C. The attaching member 31 also includes a restraining piece 31D that restrains the second rotational member 33 from moving in the second direction from the position shown in FIG. 2 (the position corresponding to the first rotational position).

The second rotational member 33 is biased in the second rotational direction by the second spring 37. In other words, the second spring 37 biases the second rotational member 33 in the same direction as that in which the first rotational member 32 is caused to rotate by the biasing force of the first spring 36.

The swingable member 34 is provided on the second rotational member 33, swingably about a swinging axis X3. The swingable member 34 includes a swingable engagement portion 34A that engages with the engaging edge portion 32B of the first rotational member 32. The swingable engagement portion 34A includes a cylindrical surface that contacts the engaging edge portion 32B and is positioned upstream of the swinging axis X3 in the first rotational direction. The swingable engagement portion 34A is movable in a direction toward and away from the boss 31A by the swinging of the swingable member 34. The swingable member 34 is biased by the swinging spring 38 in such a direction that the swingable engagement portion 34A thereby approaches the rotation axis X2.

By configuring the first rotational member 32, the second rotational member 33, and the swingable member 34 as described above, the interlocking mechanism 30 can be switched between a state in which the first rotational member 32 and the second rotational member 33 rotate together in the first rotational direction and a state in which each of the first rotational member 32 and the second rotational member 33 rotate independently. Therefore, the slide lock member 11 can move back to the lock position after moving from the lock position to the unlock position.

Specifically, as shown in FIGS. 3A to 3C and FIGS. 4A to 4C, when the seat back S2 moves from the first position P1 to the second position P2, the first rotational member 32 and the second rotational member 33 rotates together due to the engagement of the swingable member 34 and the first rotational member 32, and the slide lock member 11 thereby moves from the lock position to the unlock position. As shown in FIGS. 5A to 5C and FIGS. 6A to 6C, when the seat back S2 moves from the second position P2 to the third position P3, the swingable member 34 is disengaged from the first rotational member 32, and each of the first rotational member 32 and the second rotational member 33 become independently rotatable, and therefore the slide lock member 11 moves from the unlock position to the lock position.

The torque exerted on the first rotational member 32 via the seat back S2 and other members from the above-mentioned reclining spring R1 is higher than the torque exerted on the first rotational member 32 by the first spring 36 and the second spring 37. Therefore, the unit comprised of the first rotational member 32, the second rotational member 33, and the swingable member 34 can be rotated against the biasing force of the first spring 36 and the second spring 37, by the first wire W1 pulled by the biasing forces of the reclining spring R1.

The retaining member 35 is a member that restrains the rotation of the second rotational member 33 in the second rotational direction to thereby retain the slide lock member 11 in the unlock position when the first rotational member 32 is positioned in the second rotational position, i.e., when the seat back S2 is positioned in the second position P2. The retaining member 35 is provided on the attaching member 31, and rotates about a retaining axis X4.

The retaining member 35 includes a pin 35A engagable with the restraining edge portions 32C, 33B and the connecting edge portion 33C. The pin 35A is movable in a direction toward and away from the boss 31A by the rotation of the retaining member 35.

The retaining member 35 is capable of rotating between an allowing position (the position in FIG. 2C) in which the second rotational member 33 is allowed to rotate in the second rotational direction, and a restraining position (the position in FIG. 4C) in which the second rotational member 33 is restrained from rotating in the second rotational direction. The retaining member 35 is biased in such a direction as to cause the retaining member 35 to rotate from the allowing position toward the restraining position by the restraining spring 39.

The retaining member 35 is positioned in the allowing position when the first rotational member 32 is positioned in the first rotational position, i.e., when the seat back S2 is positioned in the first position P1. When the retaining member 35 is positioned in the allowing position, the pin 35A contacts the restraining edge portions 32C and 33B. Therefore, the retaining member 35 moving from the allowing position to the restraining position by the biasing force of the restraining spring 39 can be restrained by the restraining edge portions 32C and 33B.

When the first rotational member 32 moves from the first rotational position to the second rotational position, i.e., when the seat back S2 moves from the first position P1 to the second position P2, the pin 35A is disengaged from the restraining edge portions 323C and 32B; therefore, the retaining member 35 rotates from the allowing position to the restraining position by the pin 35A disengaging from the restraining edge portions 32C and 33B. When the retaining member 35 is positioned in the restraining position, the pin 35A contacts the contact edge portion 33C. Therefore, the pin 35A is capable of restraining the motion of the second rotational member 33 in the second rotational direction by the biasing force of the second spring 37.

The retaining member 35 further includes a wire connecting part 35B to which one end of the third wire W3 is connected. The other end of the third wire W3 is connected to the seat back S2. Therefore, the retaining member 35 rotates against the biasing force of the restraining spring 39 in conjunction with the rotation of the seat back S2.

The third wire W3 connects the retaining member 35 and the seat back S2 with greater play than the first wire W1. Therefore, when the seat back S2 starts moving from the first position P1 to the third position P3, the first rotational member 32 connected to the seat back S2 by the first wire W1 immediately starts rotating, but the retaining member 35 connected to the seat back S2 by the third wire W3 does not start rotating for a while, and starts rotating when the seat back S2 is moving from the second position P2 to the third position P3.

In other words, the first wire W1 links the movement of the first rotational member 32 to the movement of the seat back S2 in both of the processes in which the seat back S2 moves from the first position P1 to the second position P2, and in the process in which the seat back S2 moves from the second position P2 to the third position P3. On the other hand, the third wire W3 does not link the movement of the retaining member 35 to the movement of the seat back S2 in the process in which the seat back S2 moves from the first position P1 to the second position P2, and only links the movement of the retaining member 35 to the movement of the seat back S2 in the process in which the seat back S2 moves from the second position P2 to the third position P3.

Next, the operation of the vehicle seat S and the operations of the relevant members when the vehicle seat S in a folded state is moved toward the front to expand the compartment space, and when the vehicle seat S moved to the front is returned to the initial state, will be described. The posture and the positions of the vehicle seat S and the relevant members in the initial state are illustrated in FIG. 3A.

Figure 4A:
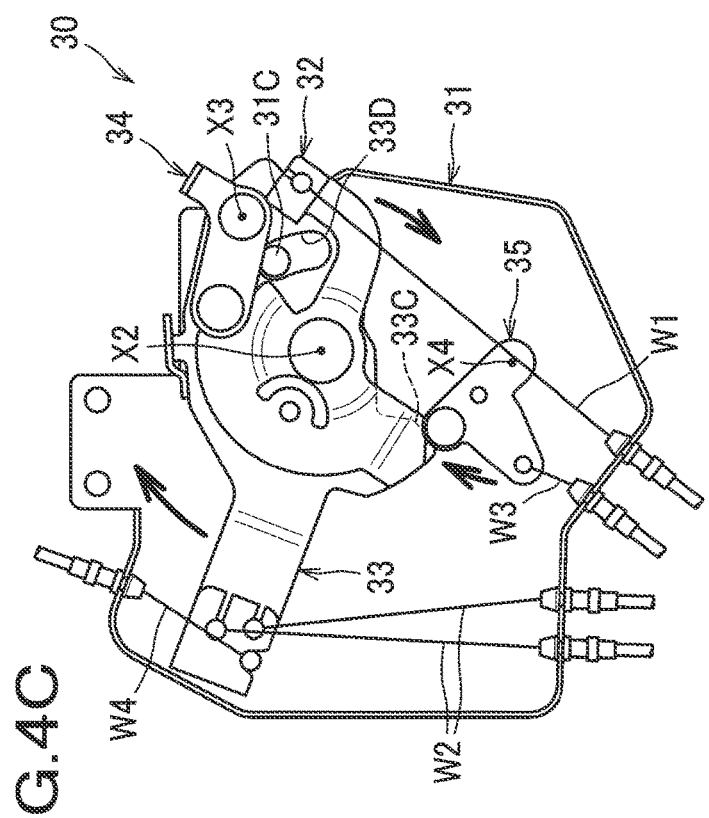
FIG. 4A is a diagram showing a state of the vehicle seat with its seat back moved from a first position to a second position.
Figure 4B:
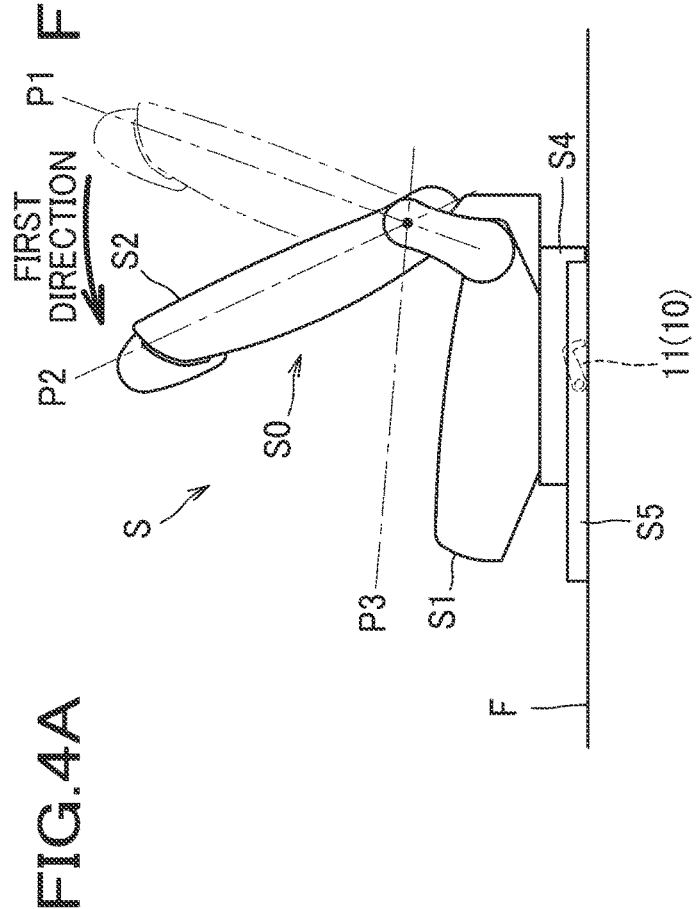
FIG. 4B is a diagram showing a state of the slide lock mechanism when the seat back is moved from the first position to the second position.
Figure 4C:
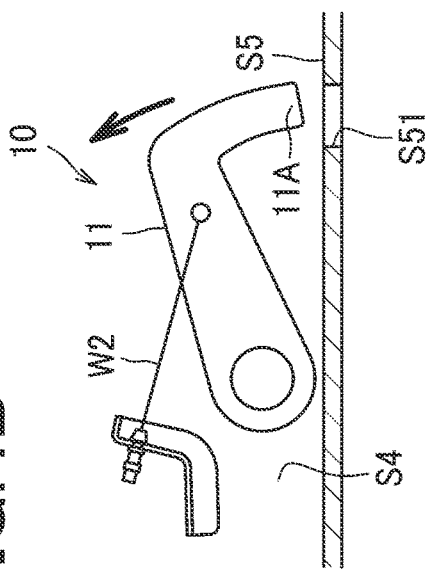
FIG. 4C is a diagram showing a state of the interlocking mechanism when the seat back is moved from the first position to the second position.
Figure 5A:
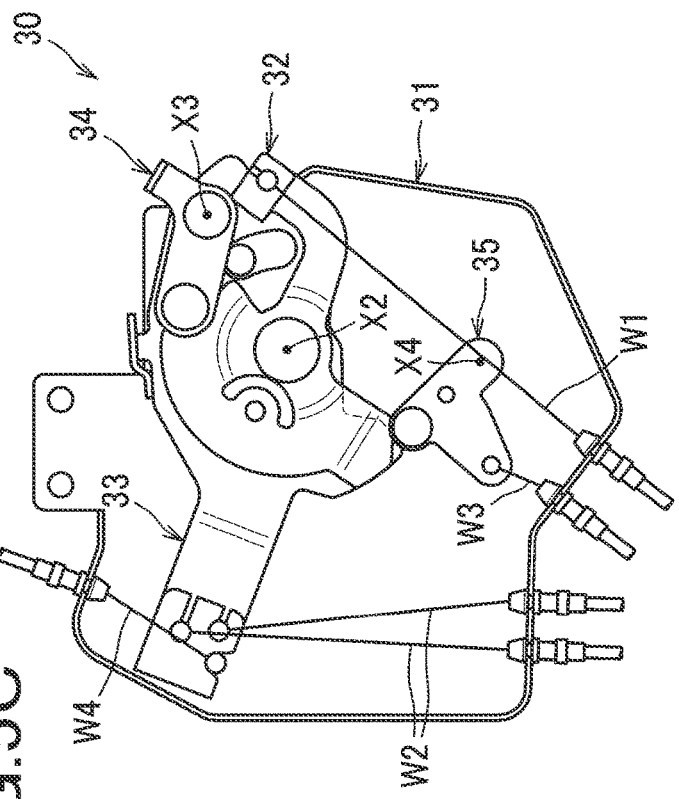
FIG. 5A is a diagram showing a state of the vehicle seat with its seat body slid to the front.
Figure 5B:
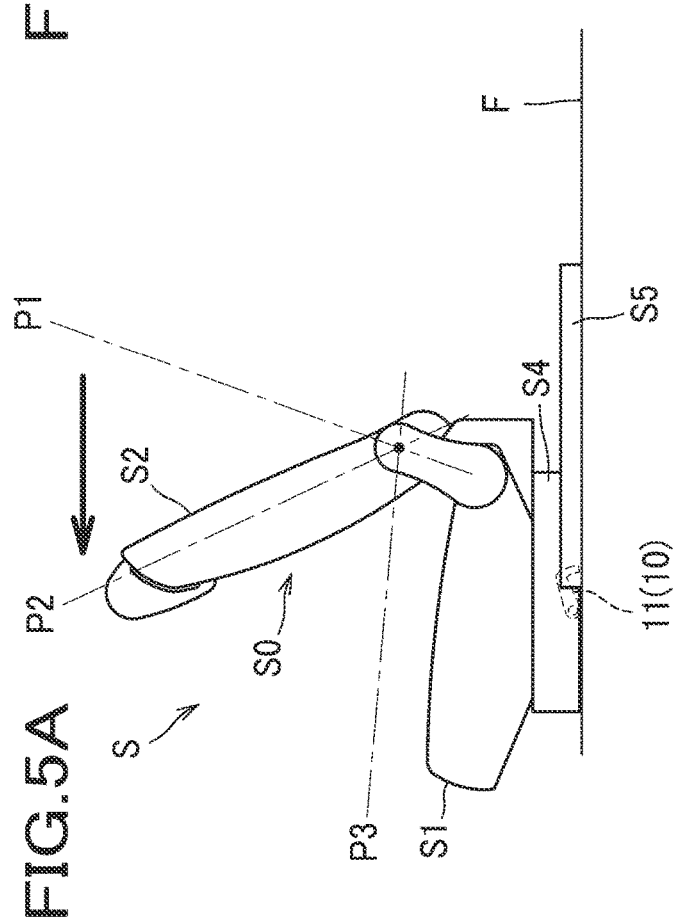
FIG. 5B is a diagram showing a state of the slide lock mechanism when the seat body is slid to the front.
Figure 5C:
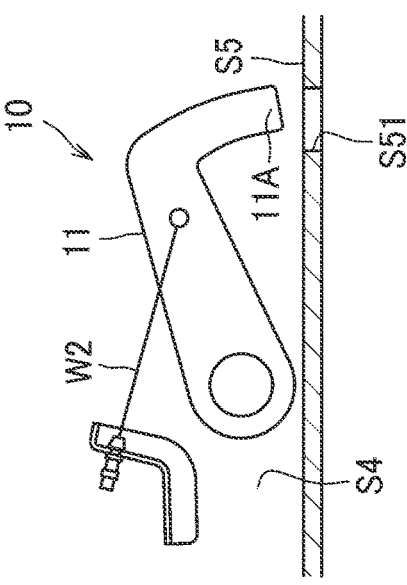
FIG. 5C is a diagram showing a state of the interlocking mechanism when the seat body is slid to the front.

As shown in FIG. 1, when the occupant operates the reclining release lever L1 and releases the lock of the reclining device R, the seat back S2 is caused to rotate from the first position P1 towards the second position P2 by the biasing force of the reclining spring R1, as shown in FIG. 3A and FIG. 4A. When the first wire W1 is pulled by the rotation of the seat back S2, the first rotational member 32 rotates in the first rotational member in synchronization with the second rotational member 33.

When the second rotational member 33 rotates in the first rotational direction, and the second wire W2 is pulled by the second rotational member 33, the slide lock member 11 moves from the lock position to the unlock position. When the seat back S2 reaches the second position P2, the seat back S2 is retained in the second position P2 by the retaining spring. Therefore, the first rotational member 32 and the second rotational member 33 are retained in the respective positions as shown in FIG. 4C. Therefore, the slide lock member 11 pulled by the second wire W2, connected to the second rotational member 33, is retained in the unlock position.

When the seat back S2 reaches the second positon P2, the retaining member 35 disengages from the restraining edge portions 32C and 33B shown in FIG. 2, and rotates from the allowing position to the restraining position. The restraining member 35 restrains the second rotational member 33 from rotating in the second direction by the force received from the second spring 37 and the spring that biases the slide lock member 11, and the like.

Thereafter, when the occupant slides the seat body S0 toward the front as shown in FIG. 5, and then rotates the seat back S2 from the second position P2 to the third position P3 against the biasing force of the retaining spring, as shown in FIGS. 6A to 6C, the seat back S2 is locked in the third position P3 by the seat back lock member. When the seat back S2 is rotated from the second position P2 to the third position P3, the seat back S2 pulls the first wire W1 and the third wire W3. When the first wire W1 is pulled, the first rotational member 32 thereby rotates in the first rotational direction, and moves from the second rotational position to the third rotational position. When the third wire W3 is pulled, the retaining member 35 thereby rotates from the restraining position to the allowing position. Therefore, the second rotational member 33 becomes rotatable in the second rotational direction.

In the process of rotation of the first rotational member 32 from the second rotational position to the third rotational position, when the swingable member 34 disengages from the engaging edge portion 32B of the first rotational member 32, the second rotational member 33 returns to its initial position by the biasing force of the second spring 37 (refer to FIG. 2). Thus, the second wire W2 is loosened and the slide lock member 11 moves from the unlock position to the lock position again. From the above, the vehicle seat S can be folded and moved to the front, so that the compartment space can be expanded.

To cause the vehicle seat S moved to the front to be returned to the initial state, the occupant releases the lock of the seat back lock member and thereby causes the seat back S2 to rotate from the third position P3 to the second position P2. Then, when the occupant rotates the seat back S2 from the second position P2 to the first position P1 against the biasing force of the reclining spring R1, the seat back S2 is locked in the first position P1 by the reclining lock member of the reclining device R.

Figure 7A:
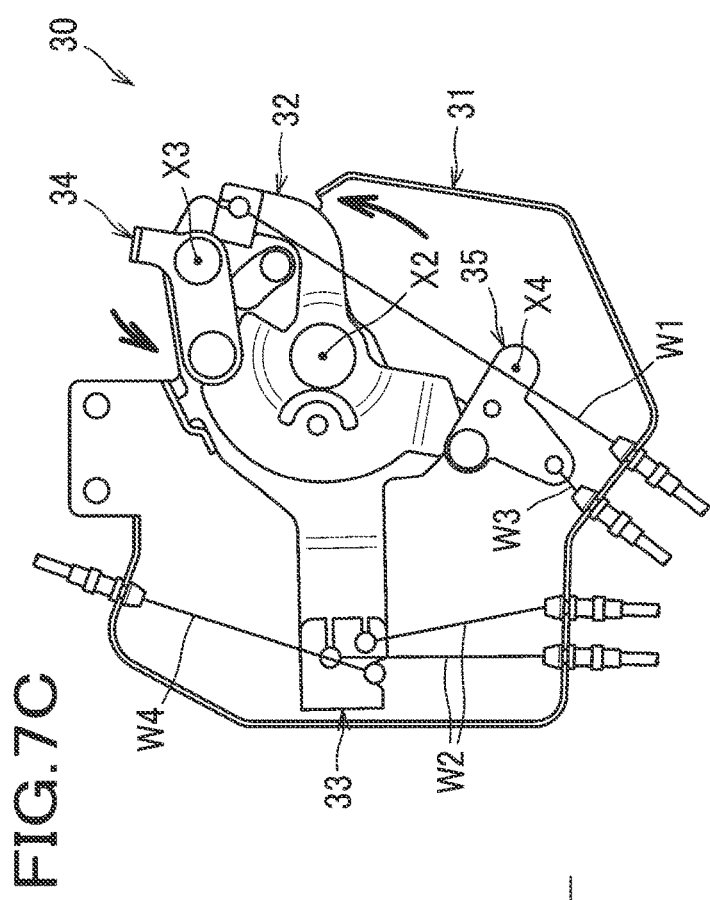
FIG. 7A is a diagram showing a state of the vehicle seat when the seat back is returned from the third position to the first position.
Figure 7B:
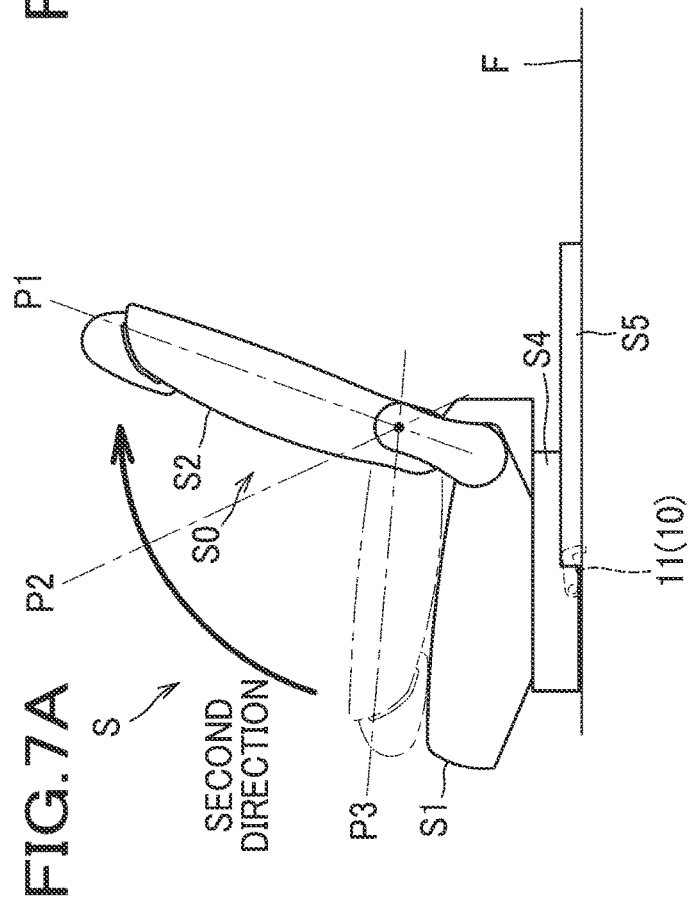
FIG. 7B is a diagram showing a state of the slide lock mechanism when the seat back is returned from the third position to the first position.
Figure 7C:
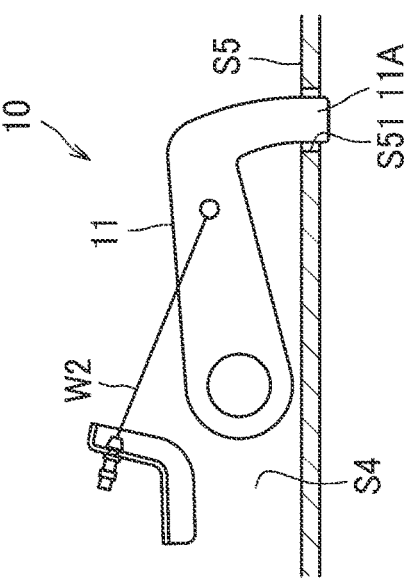
FIG. 7C is a diagram showing a state of the interlocking mechanism when the seat back is returned from the third position to the first position.

As shown in FIG. 7, when the seat back S2 rotates from the third position P3 to the first position P1, the first wire W1 is loosened and the first rotational member 32 rotates from the third rotational position to the first rotational position. When the first rotational member 32 returns to the first rotational position, the swingable member 34 is caused to swing toward the rotation axis X2 by the biasing force of the swinging spring 38 and engages with the engaging edge portion 32B of the first rotational member 32 (refer to FIG. 2) again.

When the third wire W3 is loosened by the rotation of the seat back S2 from the third position P3 to the first position P1, the retaining member 35 is pressed against the restraining edge portions 32C and 33B of the first rotational member 32 and second rotational member 33 by the biasing force of the restraining spring 39. From the above, the interlocking mechanism 30 is returned to the initial state.

Subsequently, the occupant may operate the slide lock unlocking lever L2 shown in FIG. 1 to release the lock of the slide lock member 11 and case the seat body S0 to slide to the rear so that the vehicle seat S can be returned to the initial state. When the occupant operates the slide lock unlocking lever L2, the fourth wire W4 causes the second rotational member 33 to rotate in the first rotational direction, and the second rotational member 33 pulls the second wire W2, so that the lock of the slide lock member 11 is released.

According to the above, the following advantageous effects can be achieved in the present embodiment.

A new mechanism for interlocking the slide lock member 11 that locks the sliding movement of the seat cushion S1 (lower structure S4) and the seat back S2 that moves relative to the seat cushion S1 can be provided.

Since the first rotational member 32 and the second rotational member 33 are configured to rotate about a common rotational axis X2, the interlocking mechanism 30 can be made smaller in size compared to, for example, a configuration in which the rotation axis of the first rotational member and the rotation axis of the second rotational member are located at different positions, so that the vehicle seat S can be made smaller in size.

Since the retaining member 35 restrains the rotation of the second rotational member 33, the slide lock member 11 can be more securely retained in the unlock position.

The above-described embodiment can be modified as described below into various forms for practical implementations.

The first movable part may not be slid, but rotate instead relative to the base part. For example, the seat body as the first movable part can be configured to rotate relative to the lower rail as the base part about a vertical axis.

The second movable part may not rotate, but slide instead relative to the first movable part.

The base part is not limited to the lower rail, and, for example, can be another part fixed to the lower rail. The base part may also not be fixed to the vehicle floor. The base part may be the seat cushion, the first movable part may be the seat back and the second movable part may be a member that rotates relative to the seat back, for example, an arm rest.

In the above-described embodiment, the reclining lock member is given as an example of a second lock member that can lock the second movable part in the first position, but the member may be any member that can lock the second movable part in the first position.

In the above-described embodiment, the retaining member for retaining the second rotational member in the position corresponding to the second rotational position is provided, but the retaining member may be omitted if the engagement of the swinging member and the first rotational member is retained when the first rotational member is positioned in the second rotational position.

The connecting member is not limited to wires, and for example can be bars or the like.

The elements described in the above described embodiment and their modified examples can be implemented selectively and in combination.

What is claimed is:

1. A vehicle seat with a seat cushion and a seat back, comprising:
a base part;
a first movable part movable relative to the base part;
a second movable part movable relative to the first movable part from a first position to a second position in a first direction, from the second position to a third position in the first direction, from the third position to the second position in a second direction opposite to the first direction, and from the second position to the first position in the second direction;
a lock member configured to move between a lock position in which the movement of the first movable part is locked and an unlock position in which lock of the first movable part is released; and
an interlocking mechanism configured to link movement of the second movable part to movement of the lock member,
wherein the interlocking mechanism comprises;

an attaching member that is attached to the vehicle seat;

a first rotational member and a second rotational member that are rotatably provided on the attaching member;

a first connecting member that connects the second movable part and the first rotational member;

a second connecting member that connects the lock member and the second rotational member; and a swingable member swingably provided on the second rotational member such that the swingable member engages with the first rotational member when the second movable part is positioned in a range between the first position and the second position, and disengages form the first rotational member in the process in which the second movable part moves from the second position to the third position, wherein when the second movable part moves from the first position to the second position, engagement of the first rotational member and the swingable member causes the first rotational member and the second rotational member to rotate together, whereby the lock member moves from the lock position to the unlock position, and wherein when the second movable part moves from the second position to the third position, the swingable member disengages from the first rotational member, permitting the first rotational member and the second rotational member to rotate independently, whereby the lock member moves from the unlock position to the lock position.

2. The vehicle seat according to claim 1, wherein the first rotational member and the second rotational member rotate about a common rotation axis.

3. The vehicle seat according to claim 1, wherein the interlocking mechanism comprises a retaining member that retains the lock member in the unlock position by restraining the second rotational member from rotating when the second movable part is in the second position.

4. The vehicle seat according to claim 3, wherein the retaining member is capable of being rotated between a restraining position in which the second rotational member is restrained from rotating and an allowing position in which the second rotational member is allowed to rotate, wherein when the second movable part is positioned in the first positon, the retaining member is positioned in the allowing position and when the second movable part moves from the first position to the second position, the retaining member rotates from the allowing position to the restraining position.

5. The vehicle seat according to claim 4, wherein the interlocking mechanism comprises a restraining spring that biases the retaining member in such a direction as to cause the retaining member to rotate from the allowing position toward the restraining position.

6. The vehicle seat according to claim 4, wherein the interlocking mechanism further comprises a third connecting member that connects the second movable part and the retaining member, and wherein the retaining member is configured to rotate from the restraining position to the allowing position when the second movable part moves from the second position to the third position.

7. The vehicle seat according to claim 6, wherein the first connecting member links movement of the second movable part to movement of the first rotational member when the second movable part moves from the first position to the second position and when the second movable part moves from the second position to the third position, and wherein the third connecting member does not link movement of the second movable part to movement of the retaining member when the second movable part moves from the first position to the second position, and links movement of the second movable part to a movement of the retaining member when the second movable part moves from the second position to the third position.

8. The vehicle seat according to claim 1, wherein the interlocking mechanism comprises:

a first spring that biases the first rotational member in a direction opposite to a direction of a force that the first rotational member receives from the first connecting member; and a second spring that biases the second rotational member in a direction of rotation the first rotational member is caused to make by the biasing force of the first spring.

9. The vehicle seat according to claim 8, comprising a drive spring that biases the second movable part to cause the second movable part to move from the first position toward the third position, wherein a torque applied by the drive spring to the first rotational member is higher than a total torque applied by the first spring and the second spring to the first rotational member.

10. The vehicle seat according to claim 1, wherein the lock member is a slide lock member for locking and unlocking the sliding movement of the seat cushion.

* * * * *